(12) United States Patent
Gerlach et al.

(10) Patent No.: US 8,557,009 B2
(45) Date of Patent: Oct. 15, 2013

(54) CERAMIC FILTER ELEMENT AND METHOD OF MANUFACTURE

(75) Inventors: Karin Gerlach, Eningen u. A. (DE); Stefan Tudyka, Neusaess (DE); Jochen Linhart, Schwaikheim (DE); Andreas Franz, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 195 days.

(21) Appl. No.: 13/033,979

(22) Filed: Feb. 24, 2011

(65) Prior Publication Data

US 2011/0173939 A1 Jul. 21, 2011

Related U.S. Application Data

(63) Continuation-in-part of application No. 11/651,544, filed on Jan. 10, 2007, now Pat. No. 7,913,377, which is a continuation of application No. PCT/EP2005/052884, filed on Jun. 21, 2005, application No. 13/033,979, which is a continuation-in-part of application No. 11/945,371, filed on Nov. 27, 2007, now abandoned.

(30) Foreign Application Priority Data

Jul. 10, 2004 (DE) .......................... 10 2004 033 494
Nov. 27, 2006 (DE) .......................... 10 2006 056 196

(51) Int. Cl.
*B01D 24/00* (2006.01)
*B01D 39/14* (2006.01)
*B01D 39/06* (2006.01)
*B01D 50/00* (2006.01)
*H05B 3/00* (2006.01)

(52) U.S. Cl.
USPC ................... 55/523; 55/522; 55/524; 29/611; 422/169; 422/170; 422/171; 422/172; 422/177; 422/178; 422/179; 422/180; 422/181; 422/182

(58) Field of Classification Search
USPC ............. 55/522–524; 422/169–172, 177–189
See application file for complete search history.

(56) References Cited

U.S. PATENT DOCUMENTS

| | | | | |
|---|---|---|---|---|
| 4,528,008 A * | 7/1985 | Takagi et al. | ................... | 55/485 |
| 4,652,286 A | 3/1987 | Kusuda et al. | | |
| 5,820,646 A * | 10/1998 | Gillingham et al. | ............ | 55/488 |
| 5,888,262 A * | 3/1999 | Kahler | ............................ | 55/497 |
| 6,534,021 B1 * | 3/2003 | Maus | ............................ | 422/180 |
| 6,673,414 B2 * | 1/2004 | Ketcham et al. | ............... | 428/116 |

(Continued)

*Primary Examiner* — Amber Orlando
(74) *Attorney, Agent, or Firm* — James Hasselbeck (57) ABSTRACT

A method of manufacturing a ceramic diesel particle filter (DPF) and a DPF manufactured by the method, the DPF having a ceramic filter body (1) including gas channels (18, 18') with planar and porous filter segments (3), which are provided for the exhaust gas stream (2) to flow through them transversely to the face of the filter segments (3). The filter body (1) is formed by sintering at least one ceramic-impregnated fiber web (4) in a firing step under heat such that fibers (5) of the fiber material are burned off and the ceramic material (6) is sintered together to form the porous filter segment (3) between its two surfaces (7, 8). At least one fiber web (4) is corrugated to form the gas channels (18, 18') and rolled up to form the filter body (1), and the cross section of at least a portion of the gas channels (18, 18') changes from an inlet end (33) to a discharge end (34).

9 Claims, 3 Drawing Sheets

(56) References Cited

U.S. PATENT DOCUMENTS

| | | | |
|---|---|---|---|
| 6,764,743 B2* | 7/2004 | Kato et al. | 428/118 |
| 7,468,166 B2* | 12/2008 | Gaiser | 422/180 |
| 2003/0072694 A1* | 4/2003 | Hodgson et al. | 422/180 |
| 2004/0177600 A1* | 9/2004 | Ichikawa et al. | 55/523 |
| 2004/0208803 A1* | 10/2004 | Bruck | 422/180 |
| 2007/0186911 A1* | 8/2007 | Gerlach et al. | 123/556 |
| 2010/0129271 A1* | 5/2010 | Micke et al. | 422/180 |
| 2011/0107732 A1* | 5/2011 | Schildermans et al. | 55/482.1 |

* cited by examiner

Fig. 8

CERAMIC FILTER ELEMENT AND METHOD OF MANUFACTURE

CROSS REFERENCE TO RELATED APPLICATIONS

The present patent application is a continuation in part (CIP) of U.S. patent application Ser. No. 11/651,544, filed Jan. 10, 2007, now U.S. Pat. No. 7,913,377 titled "Method for producing a ceramic filter element" which is a continuation of international patent application no. PCT/EP2005/052884, filed 21 Jun. 2005, designating the United States of America, and published in German on Jan. 19, 2006 as WO 2006/005668, the entire disclosure of which is incorporated herein by reference and to the fullest extent of the law. Priority is claimed based on Federal Republic of Germany patent application no. 1020040334 94.3, filed 10 Jul. 2004. All the contents of U.S. patent application Ser. No. 11/651,544 are incorporated herein by reference and to the fullest extent of the law. The present patent application is a continuation in part (CIP) of U.S. patent application Ser. No. 11/945,371, now abandoned, titled "Diesel Particle Filter with a Ceramic Filter Body" filed 27 Nov. 2007, the entire contents are which are incorporated herein by reference and to the fullest extent of the law. U.S. patent application Ser. No. 11/945,371 claims priority from Federal Republic of Germany patent application no. 102006056196.1, filed 27 Nov. 2006.

TECHNICAL FIELD

The invention relates to a diesel particle filter with a ceramic filter body for filtering an exhaust gas stream of a diesel engine. The filter body has flat or solid segments and porous filter segments, which are provided to facilitate flow of the exhaust gas stream through the filter transversely to the face of the filter segments.

BACKGROUND OF THE INVENTION

Published Japanese patent application no. JP 63134020 A describes a ceramic filter element for an exhaust filter in an internal combustion engine that is constructed from a corrugated, spirally wound filter sheet. To manufacture the filter sheet, heat-resistant inorganic fibers in an aqueous suspension are mixed with ceramic powder and processed into a sheet. Several superimposed sheets are rolled into the desired shape of the filter body, so that honeycomb flow paths are formed between adjacent filter sheets. The filter body is subsequently fired at a high temperature.

A disadvantage of this ceramic filter element is that it is relatively costly to manufacture. In a first process step, a filter sheet must first be produced from the suspension of heat resistant inorganic fibers and the raw ceramic powder. This filter sheet must then be processed into the desired filter shape in a second process step and finally fired in a third process step. A further disadvantage is that the inorganic fibers in the finished filter body can reduce the filtering efficiency.

An exhaust gas filter for diesel engines is known from U.S. Pat. No. 4,704,863 (=DE 35 01 182). The ceramic filter bodies disclosed in that document comprise stacked planar and porous filter segments between which gas channels are formed. The gas channels are alternately closed. An exhaust gas stream flowing in on the side where the gas channels are open is forced by the plugs to flow through the porous filter segments, transversely to their faces. The exhaust gas channels on the opposite side are open in the discharge direction and release the filtered exhaust gas stream. This document gives no indication as to how the ceramic filter bodies disclosed therein are manufactured. Structurally comparable bodies, known for example from exhaust gas catalysts, are produced by extrusion. This requires high tooling costs for shaping. The extrusion process limits the degrees of freedom in the shaping of the filter body, particularly the filter segments and the gas channels. A flow-optimized design of the diesel particle filter is difficult to achieve.

US patent publication no. 2007/0186911 A1 (=WO 2006/005668) describes a ceramic exhaust gas filter for internal combustion engines having a filter body formed of ceramic-impregnated paper. A smooth or solid web and a corrugated impregnated paper web each are stacked into a semi-finished product to form gas channels and then rolled up into a wound filter body. The shape of the corrugations of the corrugated paper web is constant over the entire length of the web so that the gas channels also have a constant cross section along their running length.

It is therefore an object of the present invention to provide a ceramic filter element of the aforementioned kind that is simple with regard to its configuration and can be produced inexpensively.

SUMMARY OF THE INVENTION

An object of the invention is to provide an improved method of manufacturing a ceramic diesel particulate filter element.

A further object of the invention is to provide method of manufacturing a ceramic filter, which is simple to carry out and yields filter bodies distinguished by excellent filtering characteristics.

It is also an object of the invention to provide a method of manufacturing a filter element which produces a highly stable and heat resistant ceramic filter body.

Another additional object of the invention is to provide a method of manufacturing a ceramic diesel particulate filter element which is readily adaptable to produce filter bodies having different geometries.

Another object of the invention is to provide a diesel particle filter which can achieve improved filtration at low cost.

These and other objects are achieved in accordance with the present invention by providing a method for manufacturing a ceramic filter element, said method comprising impregnating a combustible, non-ceramic substrate sheet with a ceramic slip and forming the substrate sheet to a desired geometric shape, wherein the impregnation and forming may be performed in either order; and firing the impregnated and formed sheet until the substrate sheet is burned and a rigid ceramic filter body is formed. Advantageous further refinements are described hereinafter.

In the method according to the invention for manufacturing a ceramic diesel particulate filter element, a combustible, non-ceramic, fiber web substrate sheet is saturated with a ceramic slip in a first manufacturing step. Either an organic or an inorganic material may be used for this non-ceramic substrate sheet. A substrate sheet made of paper is particularly advantageous.

In a subsequent second manufacturing steps, the substrate sheet saturated with the ceramic slip and shaped into the desired geometric form is fired until the material of the substrate sheet has burned out and a rigid filter body has formed. Since the ceramic slip saturates the substrate sheet completely, a full duplicate of the geometric structure of the substrate sheet consisting of the ceramic material is preserved after the substrate sheet material has been burned out.

This method is characterized, on the one hand, in that it basically requires only two process steps to produce the ceramic filter element. On the other hand, the use of the substrate sheet is advantageous because the substrate sheet can already be given the desired geometric structure, e.g. it can be fluted or corrugated, to create axial flow channels or paths for the exhaust gas, so that additional shaping after introducing the ceramic slip can be dispensed with. Advantageously, the flow channels have a cross section that changed from the inlet side of the flow channel to the outside side of the flow channel.

Finally, it is also advantageous that the filter body retains its geometric shape after saturation with the ceramic slip, so that the desired geometric shape of the filter body is achieved or preserved after curing or firing and no finishing is required. Furthermore, the filtering efficiency is improved because it is sufficient in principle that the filter body consists only of a ceramic material and contains no additional substances that could affect filtering efficiency.

The filter elements produced in this manner may be used, in particular, as diesel particulate filters according to the present invention.

In an advantageous embodiment, the axial flow channels each have consistent radial height relative to each other. The change in the axial flow channel cross section is preferably provided by changing a tangential width of the flow channels between the inlet side to the discharge side while maintaining the flow channel radial height.

In one advantageous further embodiment, a catalytic substance is introduced into the ceramic slip, so that the infiltration of the substrate sheet with the ceramic slip and the introduction of the catalytic substance can be performed in a single step.

To give the substrate sheet the stability required to prevent an undesired deformation during infiltration with the ceramic slip it may be useful to provide the substrate sheet with a supporting body, e.g., to apply a support grid to the substrate sheet. This support element can also be made of a combustible material, which burns when the entire filter body is fired. It is also possible, however, to form the support body of a ceramic material that remains in the finished element after completion and takes part in the filtration process. Finally, it is also possible to configure the supporting body as a heating element, e.g., in the form of heating wires, which remain in the filter body even after firing and can be heated for periodic thermal regeneration of the filter.

To create a filter body with a honeycomb structure in cross section, in which flow paths for the exhaust gas to be cleaned are formed in axial direction of the filter body, two superimposed substrate sheets may be bonded together, with at least one of the two substrate sheets being fluted or corrugated to form the flow paths. The superimposed substrate sheets are preferably bonded before being saturated with the ceramic slip. Two superimposed substrate sheets can be rolled into an approximately cylindrical filter body to form a wraparound filter. To close the flow paths at one end face, which is required for the exhaust gas to flow radially through the filter body, a ceramic adhesive is advantageously applied between the superimposed substrate sheets in the area of the one end face of the flow paths. The ceramic adhesive fully cures during firing and remains in the end face portion of the flow paths in the form of plugs.

To keep the shape of the superimposed substrate sheets prior to firing, it can be advantageous to bond them together by means of an adhesive, which during curing is burned with almost no residue. A suitable adhesive is, for example, a polymer adhesive.

In a further advantageous embodiment, the pore size of the filter body is modified after curing by applying a film using a sol-gel technology, for example, in which a sol in the form of a varnish is conventionally applied to the surface by means of, e.g., dip-coating, spray-coating or spin-coating, and a gel film is formed. In a subsequent process this gel film is then sintered or cured to form a ceramic film.

A method of manufacturing a ceramic diesel particulate filter element preferably includes the following steps and may include others. First, providing a combustible, non-ceramic, fiber web substrate sheet. The substrates sheet is then to a desired geometric shape and may be impregnated with a ceramic slip before or after forming. The formed sheet is then rolled or spirally wound to form an axial flow wraparound body having axial flow channels in which a cross section of at least a portion of the axial flow channels changes from an inlet side to a discharge side of the filter element. The axial flow wraparound body is then fired until the substrate sheet is removed by burning out and a rigid ceramic filter body is formed. The substrate sheet removed from the filter body by combustion of the substrate sheet. The desired geometric shape is preserved during the impregnating and subsequent firing.

According to a further aspect of the invention, a method of manufacturing a ceramic diesel particulate filter element includes the steps of providing a first and second combustible, non-ceramic, fiber web substrate sheet and applying a ceramic emulsion onto a surface of at least one of the sheets. At least one of the sheets is corrugated by passing between intermeshing corrugation rollers in which the corrugations formed are mutually conical resulting in flow channels that widen or narrow from an inlet side to a discharge side of the filter element. The corrugated sheet is heated to stabilize the corrugations and then overlaid onto the second sheet by pressing the sheets together thereby joining the sheets to form a semi-finished, layered product sheet. The semi-finished product sheet is then rolled or spirally wrapped to form an axial flow wraparound body having axial flow channels in which a cross section of at least a portion of the axial flow channels changes from an inlet side to a discharge side of the filter element. The wraparound body is then fired or sintered, the firing process removing the substrate sheets burning out the sheets and forming a rigid ceramic filter body. The substrate sheets are removed from the filter body by combustion.

Utilizing the above methods and further techniques disclosed herein, a diesel particulate filter may be realized in accordance with the present invention comprising a filter body formed of a ceramic material for filtering an exhaust gas stream of a diesel engine, wherein the filter body has gas channels with planar and porous filter segments, which are provided for cross flow of the exhaust gas stream transverse to the face of the filter segments, wherein the filter body is formed by sintering at least one ceramic-impregnated fiber web under heat such that fibers of the fiber web are burned off and the ceramic material is sintered together to form the continuously porous and gas-permeable filter segment between its two surfaces, wherein at least one fiber web is corrugated to form gas channels and is stacked in a plurality of superimposed layers to form the filter body, and wherein the cross section of at least a portion of the gas channels changes from an inflow side to an discharge side.

The invention thus relates to a diesel particle filter with a ceramic filter body made of a ceramic material, such that the filter body is formed of at least one ceramic-impregnated web of a fiber material, particularly paper, by sintering under heat so that the fibers of the fiber material are burned off. The ceramic material is sintered together, forming the continuously porous and gas permeable filter segment between its two surfaces. At least one fiber web is corrugated to form the gas channels and stacked in several layers to form the filter body. The term corrugation as used herein includes not only corrugations with a rounded, e.g., sinusoidal cross section, but also with an angular, e.g., triangular, rectangular or trapezoidal cross section. Any suitable, including an irregular, corrugation that forms the cross sections of the gas channels by an up and down progression may be provided.

The cross section of at least a portion of the gas channels changes from an inlet side toward a discharge side of the filter. This configuration of a variable channel cross section, which cannot be obtained using the extrusion process known in the prior art, becomes possible only with the use of a ceramic-impregnated fiber material. The volume flow of the exhaust gas stream flowing through the gas channels changes over the running length because a portion of the volume flow passes successively through the filter segments. This fact can be taken into account by changing the channel cross section along its running length. An almost arbitrary suitable pressure profile can be established in the exhaust gas stream along the running length to maximize the uniformity of the flow through the filter segments in all areas. Overall, the loading of the filter material is at least approximately uniformly distributed over its surface so that no local pressure peaks and therefore no localized areas of increased particle deposition occur.

The cross section of the inlet gas channels preferably narrows from the inlet end toward the discharge end. The cross section of the discharge gas channels preferably widens from the inlet end toward the discharge end. Particularly in a linearly varied cross-sectional progression, the flow rate along the running length of the gas channels and the pressure drop across the filter segments are at least approximately constant. Thus, the filtration loading of the individual filter segments is at least approximately constant over their entire surface, and the flow resistance is reduced. Maintenance intervals or intervals between burn-off cycles are extended.

In one preferred embodiment, the height of the gas channels is constant in a radial or stacking direction. This makes it possible to wind a continuous semi-finished product into a cylindrical filter blank. The same total cross section is available on the inlet side and the discharge side, which helps minimize the flow resistance and the associated pressure drop. For example, the cross section of the inlet gas channels may narrow from the inlet end toward the discharge end by narrowing the width of the towards the discharge end while maintaining a constant channel height in a radial or stacking direction.

In an advantageous further embodiment, the corrugated fiber web is one-dimensionally curved. In such a one-dimensional curvature, each point of the corrugated fiber web lies on a line extending within the fiber web from the inlet end to the discharge end. This corrugation can be produced by simply bending the fiber web and does not require any expansion or compression in the fiber web plane. The necessary deformation forces and material loading are low. However, multidimensional shaping may also be advantageous to achieve irregular cross-sectional progressions of the flow channels, such that the fiber web is expanded or compressed in its plane within permissible limits while crease formation is avoided.

The corrugated fiber webs can be stacked flat on top of each other and are preferably rolled into a wound filter body to achieve the stacking. The use of ceramic-impregnated fiber webs enables formation of almost any desired shape. In the impregnated but unsintered state (the state before the completion of the firing step), the fiber webs maintain the shape of the basic filter body formed from them. The dimensional stability in this state is sufficient to produce even complex shapes with thin channel cross sections and thin wall thicknesses. During the sintering process (also called the firing process herein), the fibers of the fiber webs burn out to produce the desired continuous porosity of the filter segments. In contrast to the extrusion process known in the prior art, this makes it possible to produce thinner wall thicknesses and almost any desired channel cross sections or cross-sectional progressions. Many more separate channels can be provided for the same inlet cross section. The pore size can be adjusted by using different fiber materials or ceramic impregnations. The diesel particle filters according to the invention are subject to substantially less pressure loss during flow through them for a given filtration effect.

It may for example be advantageous to form the filter body exclusively from corrugated fiber webs. In a preferred further embodiment a corrugated and a smooth or solid fiber web are alternately superimposed in relation to the layer arrangement to form the layered filter body. In particular, a semi-finished product can be provided which is formed of a corrugated fiber web and a smooth or solid fiber web adhering thereto, with the semi-finished product rolled or stacked into a filter body blank. The alternate arrangement of flat and corrugated fiber webs ensures that the individual gas channels of the diesel particle filter have a precisely defined cross section.

Depending on the filtration requirements to be met, it may be advantageous to have a tangential and/or radial flow through the filter segments. In one preferred embodiment the filter segments are formed by the corrugated fiber web. The ceramic material of the flat fiber web is preferably at least approximately gas-impermeable, or has reduced gas permeability, in the sintered state. This creates a substantially tangential flow through the filter segments, making it possible to ensure that flow and filtration conditions at the individual filter segments are at least approximately uniform over the entire filter cross section.

Adjacent gas channels are preferably alternately closed at the inlet end or at the discharge end. The gas channels closed at the discharge end represent inlet gas channels, whereas the gas channels closed at the inlet end are discharge gas channels. This alternate closure has the effect of blocking the oncoming gas flow, thereby forcing the oncoming exhaust gas to pass through the porous filter segments. The gas channels closed at the inlet end and open toward the discharge end ensure a precisely defined discharge of the filtered exhaust gas.

The gas channels may, for example, be closed by pushing in or crimping the corrugated fiber webs at an appropriate point, optionally supported by gluing. In one preferred further embodiment, plugs of ceramic material are provided to close the gas channels, such that the plugs and the fiber web are sintered together, for example into a monolithic body. The ceramic-impregnated fiber material makes it possible to produce very small channel cross sections, so that only very small plugs are required. This creates a filter body formed of a homogeneous material. If additional fastening materials for the plugs are eliminated, the filter can be exposed to high temperature loads without thermal cracking.

In one advantageous further embodiment, at least one fiber web has non-impregnated segments to form openings in the filter body. These non-impregnated segments of the filter web burn away during the sintering process. In the absence of ceramic impregnation, openings remain at these points, allowing, for example, an unhindered gas exchange between two adjacent gas channels. This makes it possible to use the flow cross section of all the gas channels for turbulence or for catalytic exhaust gas treatment, for example, e.g., in the inlet or discharge area, either before or after the adjacent plug.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components manufacturing methods related to a ceramic filter element which in embodiments is suitable for use as a diesel particulate filter. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1:
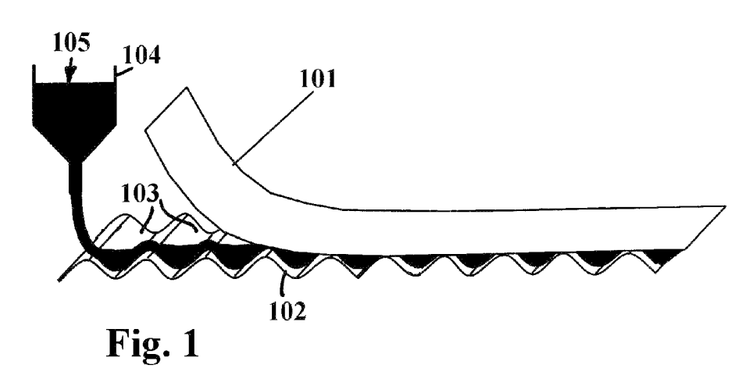
FIG. 1 shows two substrate sheets infiltrated with a ceramic slip and bonded to each other by an adhesive or a sealant, so that flow paths between the substrate sheets are sealed at one end, consistent with the present invention.

As illustrated in FIG. 1, to produce a filter element intended for use in an exhaust gas filter for internal combustion engines, two substrate sheets 101 and 102 are superimposed on each other and bonded together by means of a ceramic adhesive 105. The substrate sheets 101 and 102 are paper sheets and are made of cellulose, but other organic or inorganic combustible substances may also be considered. The lower substrate sheet 102 is corrugated to create parallel extending flow paths 103. The upper substrate sheet 101 is smooth. The two substrate sheets are bonded together by means of an adhesive 105 delivered from a hopper 104 and introduced in the region of one end face of the flow paths 103. In addition to bonding the two substrate sheets together, the adhesive has the function of closing the flow paths 103 at one end.

The use of a ceramic adhesive has the advantage that it is preserved even after subsequent firing, so that the flow paths remain securely closed. If only the two substrate sheets 101 and 102 are to be bonded together, without the additional function of closing the flow paths at one end, one can also consider a combustible adhesive, such as a polymer adhesive, which has only the function of fixing the relative position between the two substrate sheets and is completely burned after firing (also referred to herein as sintering).

Figure 2:
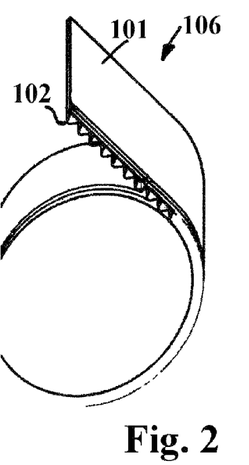
FIG. 2 is a perspective view of an exemplary embodiment of a spirally wound filter element rolled into a cylindrical body consisting of the two substrate sheets bonded as illustrated in FIG. 1, consistent with the present invention.

As illustrated in FIG. 2, the two substrate sheets 101 and 102 are spirally wound to obtain their final form. This is advantageously done even before infiltration with the ceramic slip and subsequent curing and firing. If necessary, however, it is also possible first to saturate the two bonded substrate sheets with the ceramic slip and only then to roll them into the final shape of the filter element and subsequently cure and fire them.

Figure 3:
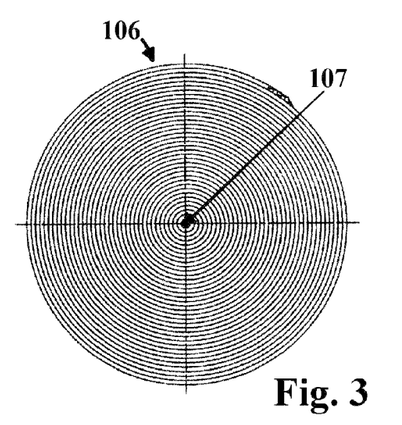
FIG. 3 is an axial end face view the axial end face of the exemplary wound filter element produced in accordance with the invention.

It may also be advantageous to encapsulate the start of the winding 107 in the center with a sealant or an adhesive to enhance the stability of the wound filter element 106, as illustrated in FIG. 3.

Aluminum oxide, cordierite, mullite or silicon carbide is suitable as the ceramic material in the slip. In another advantageous embodiment, heating elements, e.g. heating wires, are introduced into the ceramic filter element 106 so that the filter element can be heated to periodically regenerate the filter.

Figures 4, 5:
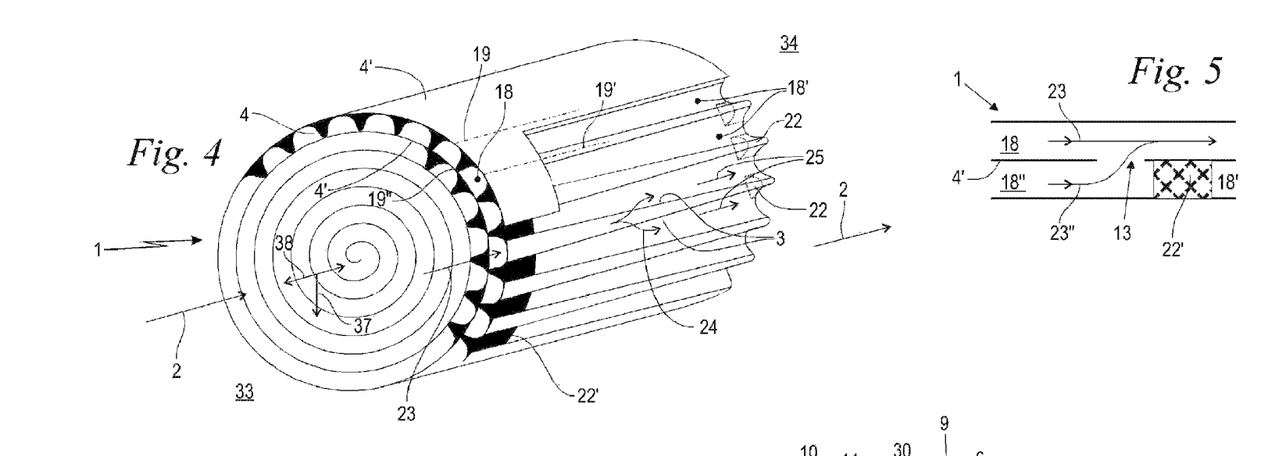
FIG. 4 is a schematic perspective view of a ceramic filter body according to the invention formed of ceramic-impregnated, rolled up and sintered fiber webs, for use in a diesel particle filter.
FIG. 5 is a schematic longitudinal section of the filter of FIG. 4 showing two adjacent gas channels with an opening formed therebetween to allow unimpeded gas exchange between the channels.
Figure 6:
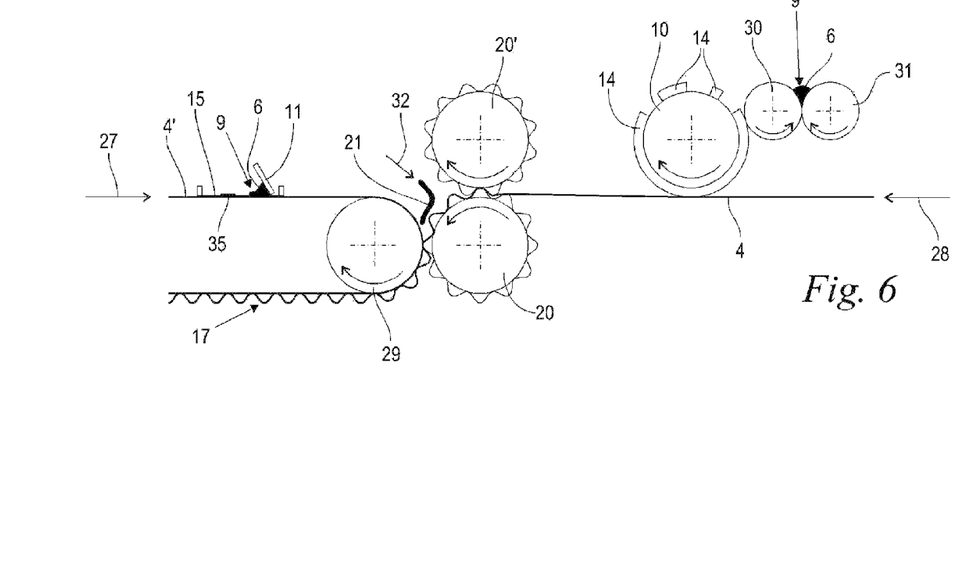
FIG. 6 is a schematic view of a rolling and application unit for impregnating fiber webs with ceramic material and shaping and joining them into a semi-finished product, consistent with the present invention.
Figure 7:
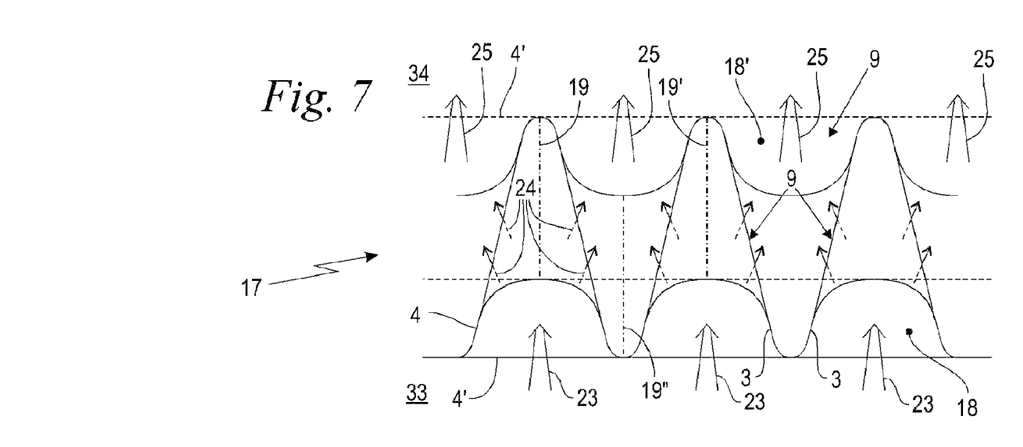
FIG. 7 is an enlarged schematic detail view of the semi-finished product depicted in FIG. 6 showing gas channels with a variable cross section and details of a joint between a corrugated impregnated fiber web and a flat impregnated fiber web to form the gas channels.

FIG. 4 is a schematic, partially cutaway perspective view of a ceramic filter body 1 using the above described production methodology and further according to the invention. The filter body 1 is part of a diesel particle filter provided to filter an exhaust gas stream 2 of a diesel engine, which is not shown here. The filter body 1 is formed of ceramic-impregnated fiber webs 4 and 4', which are described in more detail below with reference to FIGS. 6 to 8. The fiber webs 4 and 4' are joined to form a semi-finished product 17 as shown in FIGS. 6 and 7, which is rolled up to form an approximately cylindrical filter body 1. Rolling up the ceramic-impregnated fiber webs 4 and 4' to form a wound filter body creates a layer direction which is identical to the radial direction 37 of the cylindrical filter body 1. Alternatively, it may also be advantageous to arrange a plurality of corrugated fiber webs 4 or semi-finished products 17 (FIGS. 6 and 7) in one plane and layer them into a stack.

The filter body 1 is designed for the exhaust gas stream 2 to flow through it in an axial direction 38 of the filter body 1 from an inlet end 33 to a discharge end 34. For this purpose, the first fiber web 4 is corrugated and the second fiber web 4' is substantially flat or smooth. As used herein, the term "corrugation" includes corrugations with both rounded, e.g., sinusoidal, and angular, e.g., triangular, rectangular or trapezoidal cross sections. Due to the stacking or the wound structure, a corrugated fiber web 4 and a smooth fiber web 4' are alternately superimposed relative to the radial direction 37 of the wound cylindrical filter body 1.

The corrugated fiber web 4 is joined to the second, smooth fiber web 4' along a plurality of at least approximately parallel contact lines 19, 19', 19''. The corrugation of the fiber web 4, the smooth shape of the additional fiber web 4' and the wound structure create a plurality of at least approximately axially parallel gas channels 18, 18', whose height as measured in the radial direction 37 is constant along the axial direction 38 of the filter body. A gas channel 18 and a gas channel 18' are alternately provided in circumferential direction of the filter body 1. The gas channels 18 are open toward the inlet end 33 and closed by plugs 22 at the opposite or discharge end 34. In relation to the circumferential direction, a gas channel 18', which is closed by a plug 22' at the inlet end 33 and open toward the discharge end 34, lies between two gas channels 18.

In operation, the exhaust gas stream 2 flows axially parallel into the gas channels 18 which are open toward the inlet end 33 as indicated by arrow 23. Sidewalls of the ceramic structure produced by the corrugated fiber web 4 form solid and porous filter segments 3. The exhaust gas stream 2, the direct onward flow of which is blocked up by the plugs 22, is diverted in circumferential direction as indicated by arrow 24 and flows through the porous ceramic filter segments 3 transversely to their surface.

As indicated by arrows 24, the exhaust gas stream 2 passes through the filter segments 3 into the channels 18', which are open toward the discharge end 34, and flows out of these channels as indicated by arrows 25. As the exhaust gas stream 2 passes through the porous filter segments 3, the diesel particles, etc. entrained in the exhaust gas stream are filtered out.

For certain applications it may be useful to provide openings 13 in the filter area formed by the solid or smooth fiber web 4', the production of which is described below. The schematic longitudinal section of FIG. 5 shows such an opening 13 arranged upstream of a plug 22', for example. The inlet gas channel 18 extends continuously past the plug 22'. The adjacently arranged channel structure is divided by the plug 22' into the discharge gas channel 18' and an inlet channel segment 18''.

The exhaust gas stream 2 (FIG. 4) can flow into the filter body 1 upstream of the plug 22' using the flow cross section of the gas channels 18 and the channel segments 18''. In this region, e.g., a catalytic coating may be provided using the entire flow cross section. Upstream of the plug 22' the exhaust gas from channel segment 18'' is diverted through the opening 13 into the inlet gas channel 18 as indicated by arrow 23''. There it is combined with the gas stream indicated by arrow 23, resulting in the filtration function described above.

Openings 13 may similarly be provided downstream of the plug 22 (FIG. 4). It may also be advantageous to provide such openings 13 in the filter region formed by the corrugated fiber web 4. Another advantageous option is to allow the exhaust gas to flow not only in axial direction 38 and circumferential direction indicated in FIG. 4, but also to flow through the channel walls the radial direction 37. In this case, the filter regions formed by the flat fiber web 4' are also made porous and form filter segments through which the exhaust gas can flow radially.

FIG. 6 is a schematic representation of a device for producing the filter body 1 according to the invention (FIG. 4). Two feed rollers 30, 31 of the depicted unit are arranged axially parallel to each other and are set flush adjacent each other. They rotate in opposite directions, and the ceramic material 6 is stored in a wedge-shaped gap formed above their contact line. The ceramic material 6 may be a dry powder of finely ground ceramic, which is provided for dry impregnation of the fiber web 4. In the example shown, the ceramic material 6 is used to produce an aqueous emulsion 9. However, another suitable liquid or a liquid mixture may also be used instead of water. The ceramic material 6 is preferably aluminum oxide, cordierite, mullite, silicon carbide and/or aluminum titanate, which may either be used alone or in various combinations.

Another roller 10 is arranged axially parallel to the feed roller 30, which it contacts along a contact line. Because of its rotation, indicated by an arrow, the feed roller 30 carries the ceramic emulsion 9 to the roller 10 and rolls the ceramic emulsion 9 onto the surface of the roller 10. The roller 10 then rolls the ceramic material 6 into the material of the fiber web 4, which is guided underneath it as indicated by arrow 28. To this end, the roller 10 is pressed against the fiber web 4 with a contact pressure. The fiber web 4 is saturated with the emulsion 9. The flat, permeable fiber web 4 takes up the finely ground ceramic material 6 within its entire cross section.

The endless fiber web 4 then passes between two intermeshing corrugated rollers 20, 20' set axially parallel to each other in the direction of arrow 28, giving the fiber web 4 impregnated with ceramic material 6 a corrugated shape. The corrugations of the corrugated rollers 20, 20' are approximately mutually conical, so that the corrugations of the fiber web 4 also become mutually conical as shown in FIG. 4. That is to say, the corrugations are formed with a cross section which widens or narrows in the flow direction. The two corrugated rollers 20 and 20' are heated. This causes the fiber web 4 impregnated with the emulsion 9 to dry slightly, but not thoroughly, so as to stabilize the corrugation.

Another fiber web 4' is fed to the depicted device in the opposite direction, as indicated by arrow 27, and circulates around a pressure roller 29. A screen 15 contacts the fiber web 4' in front of the pressure roller 29 as seen in the moving direction indicated by arrow 27. Above the screen 15 is stored an aqueous emulsion 9 with the ceramic material 6. The emulsion 9 is applied to the material of the fiber web 4' by a squeegee 11 through the screen under pressure to saturate the fiber web 4' with the emulsion 9. Alternatively, the fiber web 4' may be dry-impregnated with the ceramic material 6. It may also be advantageous to impregnate the fiber web 4' using a roller arrangement 10, 30, 31 like the one used for the opposite fiber web 4. Likewise, the corrugated fiber web 4 may advantageously be impregnated using a screen 15 and a squeegee 11.

The pressure roller 29 contacts the lower corrugated roller 20. Because of the opposing rotation of the pressure roller 29 and the corrugated roller 20, the flat fiber web 4' and the corrugated fiber web 4 are pressed and joined together. Behind the roller arrangement 29, 20 as seen in the feed direction, is produced a semi-finished product 17, which will be described in more detail with reference to FIG. 7.

FIG. 7 is an enlarged schematic detail view of the semi-finished product 17 illustrated in FIG. 6. The corrugation peaks of the corrugated fiber web 4 contact the smooth fiber web 4' located above it along contact lines indicated by broken lines 19, 19' and is bonded thereto along the contact lines 19, 19'. If desired, this bond may be produced using a suitable adhesive. In the illustrated embodiment the bond is produced by the ceramic emulsion 9 in the fiber webs 4, 4'. It may also be advantageous to apply additional ceramic emulsion 9 along the contact lines 19, 19', optionally in a thickened form, to obtain a bond between the two fiber webs 4 and 4'. In the bonded state of the semi-finished product 17, the subsequent gas channels 18, 18' are preformed by the corrugation structure of the corrugated fiber web 4 and the smooth form of the flat fiber web 4', so that the sidewalls of the corrugated fiber web 4 are provided for forming the subsequent filter segments 3.

The semi-finished product 17 saturated with the ceramic emulsion 9, when it is still in its moist state, i.e., when the emulsion 9 has not yet thoroughly dried, is wound or rolled into the shape of the subsequent filter body 1 depicted in FIG. 4, or is stacked, and then dried. During winding or stacking, corrugation valleys of the corrugated fiber web 4 are bonded to the underlying flat fiber web 4' along contact lines 19", so that not only the gas channels 18, but also the additional gas channels 18', are closed in the radial and circumferential directions of the approximately cylindrical filter body 1 (FIG. 4). The bond along the contact lines 19" is formed in the same manner as that along the contact lines 19, 19'.

After the drying process, the resulting filter blank is sintered under heat in a sintering furnace, so that the ceramic material 6 is sintered together to form a monolithic ceramic body. At the high sintering temperature, the material of the fiber webs 4, 4' burns away completely, so that a specific porosity of the ceramic material 6 is obtained. The porosity is such that the exhaust gas stream 2 (FIG. 4) can flow through the ceramic filter segments 3, transversely to the faces thereof.

The cross section of the gas channels 18, 18' changes along the axial direction 38. The cross section of the inlet gas channels 18 narrows from the inlet end 33 toward the discharge end 34. Conversely, the cross section of the discharge gas channels 18' widens from the inlet end 33 to the discharge end 34, but the channel height of all the gas channels 18, 18' remains constant. This is achieved by forming the corrugations of the fiber web 4 with wide corrugation peaks at the inlet end 33 and narrow corrugation peaks at the discharge end 34. In the embodiment shown, the width of the corrugation peaks decreases linearly from the inlet end 33 to the discharge end 34.

Because the channel height remains constant and the fiber web 4 has a one-dimensional, approximately conical curvature, the progression of the cross section is also approximately linear. A different, non-linear progression, obtained particularly by a multidimensional spatial curvature of the fiber web 4, may, however, also be useful. Alternatively, a corrugation structure in which the cross section of the gas channels 18, 18' is approximately constant from the inlet end 33 to the discharge end 34 may also be advantageous.

The exhaust gas stream 2 entering the gas channels 18 along arrows 23 (FIG. 4) passes through the filter segments 3 as indicated by arrows 24 along the entire running length of the gas channels 18, 18'. This reduces the oncoming volumetric flow 23 in gas channel 18 along the channel's running length, while the discharge volumetric flow 25 in gas channel 18' progressively increases along that channel's running length.

The above-described cross-sectional progression of the gas channels 18, 18' has the result that the flow rate within the gas channels 18, 18' and the pressure differential between the gas channels 18, 18' as measured across the filter segments 3 are at least approximately constant along the channels' running length. The filtration load of the filter segments 3 is therefore at least approximately constant along the running length of the gas channels 18, 18'. With regard to the other features and reference numerals, the embodiment illustrated in FIG. 7 corresponds to that of FIG. 4.

Figure 8:
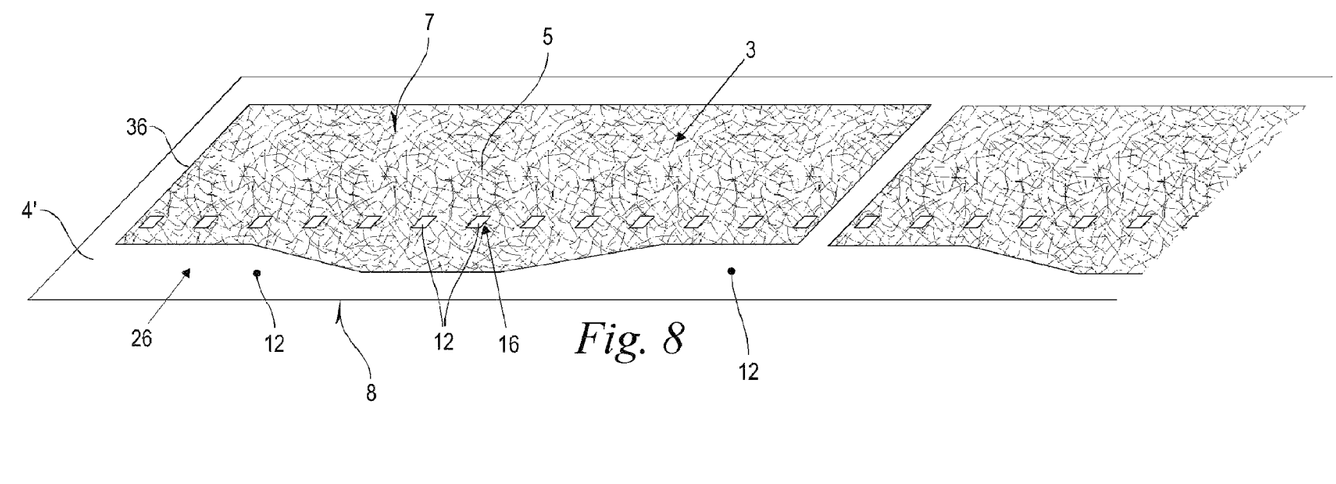
FIG. 8 is a schematic perspective view of a fiber web partly impregnated and provided with cutouts using the unit depicted in FIG. 6.

FIG. 8 is a schematic perspective view of the endless fiber web 4'. The description below applies analogously also to the other fiber web 4 (FIG. 6). The fiber webs 4 and 4' are comprised of fibers 5. A non-woven fabric or knit fabric may be provided for this purpose. An open, permeable filter paper is preferred. The fiber web 4' is planar and permeable in the sense that the finely ground ceramic material 6 (FIG. 6) can penetrate between fibers 5 of the fiber web 4. The permeability of the fiber web 4 and the impregnation process illustrated in FIG. 6 are adjusted to each other so that after impregnation with the ceramic material 6 (FIG. 6), some of the fibers 5 are exposed on the two opposite surfaces 7, 8 of the fiber web 4.

When the fibers 5 are burned off during the sintering process, this has the result that the sintered ceramic filter segment 3 is porous throughout from a surface 7 to the opposite surface 8 and therefore gas-permeable for the exhaust gas stream 2 (FIG. 4) transversely to the face of the filter segment 3.

For certain applications it may be useful to produce a reduced porosity, at least in sections, and therefore at least approximate gas impermeability. For example, the porosity of the filter body 1 (FIG. 4) can be so low in the region of the smooth fiber web 4' that, technically, in terms of the filtration process, it is practically gas-impermeable, and a noticeable gas permeability is desired only in the region of the corrugated fiber web 4. In this case, the fiber web 4 is subjected not only to a saturating impregnation but also a closed surface coating with the ceramic material 6 (FIG. 6) on at least one of the two surfaces 7, 8, so that no fibers 5 are exposed there. In this case, a closed ceramic body is created during sintering which is barely porous in the region of the surface 7, 8 and therefore essentially gas-impermeable in a technical sense. The adjustment of the gas permeability and gas impermeability may also be accomplished or supported by a corresponding adjustment of the ceramic material 6.

It may be advantageous to impregnate the fiber webs 4, 4' as uncut endless material over their full area with ceramic material 6 (FIG. 6). Non-impregnated sections 12 can be formed by stamping cutouts 16, for example, to subsequently form openings 13 (FIG. 5) or by cutting a limited planar form 36 along its margin 26. The embodiment shown in FIG. 8 has non-impregnated sections 12, which are selectively excluded from impregnation with the ceramic material 6. One portion of the non-impregnated sections 12 is omitted from impregnation to form subsequent openings 13 (FIG. 5). Another non-impregnated section 12 is formed by the margin 26 surrounding the limited planar form 36. The limited planar form 36 has the contour necessary to roll up the filter body 1 shown in FIG. 4. The planar form 36 may be produced by cutting the fiber web 4, particularly by stamping the circumferential contour of the planar form 36 and stamping out the cutouts 16. It may also be advantageous not to stamp out the cutouts 16 and only to exclude the associated sections 12 from impregnation with the ceramic material 6 (FIG. 6). This is accomplished as described below. The fiber webs 4, 4' that are only partly impregnated and/or cut are joined to form the semi-finished product 17 as described above, which is then formed into the blank of the filter body 1 illustrated in FIG. 4. In this process, the impregnated regions of the fiber webs 4 and 4' assume the shape of the filter body 1 being formed (FIGS. 4 and 5). In the subsequent sintering process, the uncut and non-impregnated sections 12 burn completely away and leave the filter body 1 in the form shown in FIGS. 4 and 5, including the openings 13 (FIG. 5).

It may be seen from FIG. 6 that the roller 10 has a surface structure 14. The shape of this structure corresponds to the contour of the planar form 36 illustrated in FIG. 7. The ceramic emulsion 9 is rolled into the fiber web 4 under pressure only by the elevated surfaces of the surface structure 14. In the intermediate, radially recessed areas of the surface structure 14, no impregnation with ceramic material 6 can occur, so that the fiber web 4, analogous to the fiber web 4' shown in FIG. 8, is only partially impregnated with the ceramic material 6 such that non-impregnated sections 12 are formed.

An alternative method of producing non-impregnated sections 12 in the fiber web 4' can be seen from FIG. 6 in the region of the screen 15. In this method, similar to screen printing, the screen 15 has covers 35, which are depicted schematically. The contours of the covers 35 correspond to the non-impregnated sections 12 shown in FIG. 8. As the ceramic emulsion 9 is applied under pressure by the squeegee 11, the covers 35, optionally also the stampings or cutouts 16 (FIG. 8), prevent saturation in part and form the non-impregnated sections 12.

It may furthermore be seen from FIG. 6 that, prior to joining the two fiber webs 4 and 4', beads 21 of ceramic material are applied to the corrugated fiber web 4 as indicated by arrow 32. The ceramic beads 21 are squeezed between the two fiber webs 4, 4' and subsequently form the plugs 22 and 22' shown in FIG. 4. In order to achieve the alternate arrangement of the plugs 22 and 22' illustrated in FIG. 4, it may be useful to apply the beads 21 intermittently. For certain applications it may also be useful to dispose the plugs 22, 22' continuously in circumferential direction, such that the associated beads 21 are also applied continuously. The beads 21 consist of a moist, soft ceramic material and are dried together with the fiber webs 4 and 4' and then sintered, so that a monolithic ceramic filter body 1 is produced as shown in FIG. 4.

In the embodiment shown, the impregnation of the fiber webs 4 and 4' with the ceramic material 6 (FIG. 6) is done first, before the corrugation of the fiber web 4, the joining to form the semi-finished product 17 and the rolling up to form the blank of the filter body 1 depicted in FIG. 4. This blank is then dried and finally sintered. It may also be advantageous first to cut and shape the blank of the filter body 1 depicted in FIG. 4 from non-impregnated fiber webs 4 and 4' in the manner described above and only then to saturate it with the ceramic material 6 (FIG. 6), e.g., in a dipping bath. A drying process and finally the sintering process are carried out thereafter.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A diesel particulate filter, comprising: a filter body formed of a ceramic material for filtering an exhaust gas stream of a diesel engine, wherein the filter body has gas channels with porous filter segments through which the exhaust gas stream can flow transversely to the face of the filter segments, wherein said filter body of ceramic material comprises at least one ceramic fiber-web sheet superimposed in layers and formed into a desired geometric shape, wherein each of said at least one ceramic fiber-web sheet includes: a combustible, non-ceramic, fiber web substrate sheet, said sheet having two opposing surfaces, a ceramic slip impregnated into the combustible, non-ceramic, fiber web substrate sheet, wherein the filter body is formed by sintering the at least one ceramic-impregnated fiber web sheet under heat in said a firing step such that fibers of the at least one ceramic-impregnated fiber web sheet are burned off and the ceramic material is sintered together to form the continuously porous and gas-permeable filter segment between its two opposing surfaces, wherein at least one fiber web sheet of the at least one ceramic-impregnated fiber web sheet is corrugated to form gas channels, said at least one ceramic-impregnated fiber web sheet arranged in a roll into a plurality of superimposed layers to form the filter body, wherein a cross section of at least a portion of the gas channels changes from an inlet side to a discharge side of said filter body, wherein said sintered filter body is a monolithic ceramic filter body.

2. The filter according to claim 1, wherein
channel wall portions of said sintered filter body are provided with a porosity differing from other channel wall portions of said sintered filter body,
said differing porosity provided by either adjustment of the ceramic material or by providing a closed surface coat of ceramic material onto at least one surface of said ceramic-impregnated fiber web prior to firing,
said differing porosity providing gas permeable channel wall portions and gas impermeable portions.

3. The filter according to claim 1, wherein
a portion of said combustible, non-ceramic, fiber web substrate sheet is not impregnated with said ceramic slip, leaving a non-impregnated sections of said combustible, non-ceramic, fiber web substrate sheet,
said non-impregnated sections of said combustible, non-ceramic, fiber web substrate sheet forming openings in channel walls of the fired filter body for passage of a portion of said gas stream.

4. The filter according to claim 1, wherein
said cross section of said inlet side gas channels narrows from said inlet side to said discharge side, and
wherein said cross section of said outlet side gas channels enlarges from said inlet side to said discharge side,
wherein said narrowing cross section and enlarging cross section is operable to approximately uniformly distribute filtered particles over interior surface of said gas channels, avoiding localized areas of increased particle deposition in said gas channels.

5. The filter according to claim 4, wherein said gas channels have a constant radial height.

6. The filter according to claim 1, wherein the porous gas-permeable filter segments are formed by the at least one ceramic-impregnated corrugated fiber web sheet, and the ceramic material of a flat ceramic-impregnated fiber web sheet is gas impermeable in the sintered state.

7. The filter according to claim 1, wherein adjacent gas channels are alternately closed at said inlet side or at said discharge side.

8. The filter according to claim 7, wherein said alternately closed channels are closed by plugs formed of ceramic material.

9. The filter according to claim 1, wherein

The combustible, non-ceramic, fiber web substrate sheet is a paper web.

* * * * *